(12) United States Patent
Gill et al.

(10) Patent No.: US 11,897,424 B2
(45) Date of Patent: Feb. 13, 2024

(54) FRONT TRUNK STORAGE SYSTEM

(71) Applicant: ABC Technologies Inc., Toronto (CA)

(72) Inventors: Harman Gill, Brampton (CA); Avinash Jayakumar, Mississauga (CA); Usman Dulatov, Newmarket (CA); Richard Louis Hamilton, Novi, MI (US); Jarek R. Gorecki, Etobicoke (CA); James W. Wells, Maidstone (CA)

(73) Assignee: ABC TECHNOLOGIES INC., Toronto (CA)

( * ) Notice: Subject to any disclaimer, the term of this patent is extended or adjusted under 35 U.S.C. 154(b) by 0 days.

(21) Appl. No.: 17/738,114

(22) Filed: May 6, 2022

(65) Prior Publication Data

US 2022/0355738 A1 Nov. 10, 2022

Related U.S. Application Data

(60) Provisional application No. 63/185,539, filed on May 7, 2021.

(51) Int. Cl.
*B60R 5/02* (2006.01)
*B60R 19/52* (2006.01)
*B62D 25/08* (2006.01)

(52) U.S. Cl.
CPC ............... *B60R 5/02* (2013.01); *B60R 19/52* (2013.01); *B62D 25/087* (2013.01)

(58) Field of Classification Search
CPC .... B60R 5/02; B60R 5/04; B60R 7/02; B60R 13/011; B62D 25/087; B62D 25/105
USPC .............................................. 296/24.4, 37.16
See application file for complete search history.

(56) References Cited

U.S. PATENT DOCUMENTS

| | | | | |
|---|---|---|---|---|
| 2,284,419 | A | * | 5/1942 | Greig ..................... B60R 5/041 |
| | | | | 224/527 |
| 2,574,483 | A | | 11/1951 | Jack |
| 3,589,768 | A | | 6/1971 | Wilson |
| 5,090,337 | A | | 2/1992 | Magistrelli |
| 5,167,433 | A | | 12/1992 | Ryan |
| 5,251,713 | A | | 10/1993 | Enokimoto |
| 5,598,962 | A | | 2/1997 | Schlachter |
| 5,692,792 | A | * | 12/1997 | Klar ........................ B60J 5/101 |
| | | | | 296/37.16 |
| 6,062,146 | A | | 5/2000 | Connors |
| 6,135,527 | A | | 10/2000 | Bily |
| 6,502,886 | B1 | | 1/2003 | Bleau et al. |
| 6,682,118 | B2 | | 1/2004 | Ryan |
| 6,752,304 | B1 | | 6/2004 | Hotary et al. |

(Continued)

FOREIGN PATENT DOCUMENTS

| CN | 107433911 B | 12/2017 |
|---|---|---|
| CN | 107696920 A | 2/2018 |

(Continued)

*Primary Examiner* — Jason S Daniels
(74) *Attorney, Agent, or Firm* — MEDLER FERRO WOODHOUSE & MILLS PLLC

(57) ABSTRACT

Provided is a front trunk cargo storage system. The system includes a main body that defines a primary storage compartment, and a load floor drawer mounted upon a floor of the primary storage compartment. The primary storage compartment includes a forward opening, and the load floor drawer is configured to be slidable outwardly from the primary storage compartment through the forward opening.

18 Claims, 14 Drawing Sheets

(56) References Cited

U.S. PATENT DOCUMENTS

| | | |
|---|---|---|
| 6,874,667 B2 | 4/2005 | Dykstra et al. |
| 7,028,872 B2 | 4/2006 | Lobanoff |
| 7,201,421 B2 | 4/2007 | Reynolds et al. |
| 7,281,742 B2 | 10/2007 | Porter et al. |
| 7,338,110 B1 | 3/2008 | Eckloff |
| 7,407,212 B1 | 8/2008 | Kataoka et al. |
| 7,631,919 B2 | 12/2009 | Schrader |
| 7,931,324 B2 | 4/2011 | Henderson |
| 8,215,693 B2 | 7/2012 | Ulita |
| 9,346,391 B2 | 5/2016 | Workman |
| 9,381,865 B2 | 7/2016 | Kmita |
| 9,440,527 B1 | 9/2016 | Maeda et al. |
| 9,682,730 B2 | 6/2017 | Huber et al. |
| 9,827,916 B1 | 11/2017 | Singer |
| 10,023,124 B2 | 7/2018 | Schmidt et al. |
| 10,137,841 B1 | 11/2018 | Neag et al. |
| 10,173,739 B2 | 1/2019 | Bellis et al. |
| 10,471,881 B2 | 11/2019 | Bhirud et al. |
| 10,480,239 B1 * | 11/2019 | Wisneski ............... B62D 25/12 |
| 10,507,769 B1 | 12/2019 | Glickman et al. |
| 10,562,456 B2 | 2/2020 | Lynch et al. |
| 10,710,424 B2 | 7/2020 | Eckert et al. |
| 10,723,390 B2 | 7/2020 | Salter et al. |
| 10,730,441 B2 | 8/2020 | Glickman et al. |
| 10,744,949 B2 | 8/2020 | Andrus et al. |
| 10,800,458 B2 | 10/2020 | Makowski et al. |
| 10,840,657 B1 | 11/2020 | Ruelas et al. |
| 10,875,462 B2 | 12/2020 | Chapdelaine et al. |
| 10,919,455 B2 | 2/2021 | Flynn et al. |
| 10,919,478 B2 | 2/2021 | O'Connor et al. |
| 10,920,950 B1 | 2/2021 | Glickman et al. |
| 10,926,705 B2 * | 2/2021 | Hoffman ................ B60R 5/02 |
| 10,953,721 B2 | 3/2021 | Gruber |
| 10,967,802 B2 | 4/2021 | Sabdad |
| 11,142,129 B2 * | 10/2021 | Howard, II ............... B60R 5/02 |
| 2003/0127482 A1 | 7/2003 | Gort |
| 2003/0127874 A1 | 11/2003 | McLaughlin et al. |
| 2004/0089625 A1 | 5/2004 | Tsai |
| 2005/0045682 A1 | 3/2005 | Tarrant et al. |
| 2005/0279793 A1 | 12/2005 | Mulvihill |
| 2008/0088147 A1 | 4/2008 | Choi |
| 2010/0270821 A1 | 10/2010 | Ulita |
| 2011/0031771 A1 | 2/2011 | Ding |
| 2011/0121046 A1 | 5/2011 | Dexter |
| 2011/0206474 A1 | 8/2011 | Daikuzono |
| 2012/0325324 A1 | 12/2012 | Widmer et al. |
| 2013/0320694 A1 | 12/2013 | Dinger et al. |
| 2016/0121803 A1 | 5/2016 | Masanek, Jr. et al. |
| 2016/0200258 A1 | 7/2016 | Chawlk et al. |
| 2017/0341586 A1 * | 11/2017 | Wang ..................... B60R 7/02 |
| 2018/0014638 A1 | 1/2018 | Hanley |
| 2018/0015883 A1 | 1/2018 | Loew |
| 2018/0326913 A1 | 11/2018 | White |
| 2019/0039659 A1 | 2/2019 | Glickman et al. |
| 2019/0118692 A1 | 4/2019 | Qiu et al. |
| 2019/0217766 A1 | 7/2019 | Altobelli |
| 2019/0375462 A1 | 12/2019 | Maier |
| 2020/0070730 A1 | 3/2020 | Gill et al. |
| 2020/0108688 A1 | 4/2020 | Gruber |
| 2020/0108763 A1 | 4/2020 | Subramanian |
| 2020/0108776 A1 | 4/2020 | Fowler et al. |
| 2020/0108777 A1 | 4/2020 | Mozurkewich et al. |
| 2020/0130751 A1 | 4/2020 | Salter et al. |
| 2020/0290517 A1 | 9/2020 | Sabdad |
| 2020/0317135 A1 | 10/2020 | Liu et al. |
| 2020/0346693 A1 | 11/2020 | Jhant et al. |
| 2021/0007478 A1 | 1/2021 | Adams |
| 2021/0039558 A1 | 2/2021 | Rucker et al. |
| 2021/0053498 A1 | 2/2021 | Howard et al. |
| 2021/0061124 A1 | 3/2021 | Kim et al. |
| 2022/0032796 A1 * | 2/2022 | Salter ..................... B60L 58/18 |

FOREIGN PATENT DOCUMENTS

| | | |
|---|---|---|
| CN | 109421604 A | 3/2019 |
| CN | 109466630 A | 3/2019 |
| CN | 111016800 A | 4/2020 |
| CN | 111301291 A | 6/2020 |
| DE | 1078883 B | 3/1960 |
| DE | 3127473 A1 | 1/1983 |
| DE | 19935762 A1 | 2/2001 |
| DE | 102004037305 A1 | 3/2006 |
| DE | 102007020924 A1 | 11/2008 |
| DE | 102008014540 B4 | 9/2009 |
| DE | 102016201985 A1 | 8/2017 |
| DE | 102017004263 A1 | 12/2017 |
| DE | 102017010161 A1 | 7/2018 |
| DE | 102017005904 A1 | 12/2018 |
| DE | 102017011984 A1 | 6/2019 |
| DE | 102018207567 A1 | 11/2019 |
| DE | 102018208799 A1 | 12/2019 |
| DE | 102018131250 B3 | 4/2020 |
| DE | 102020001881 A1 | 4/2020 |
| DE | 102018221384 A1 | 6/2020 |
| DE | 102019001342 A1 | 8/2020 |
| DE | 102019129418 A1 * | 5/2021 |
| EP | 0667260 A1 | 8/1995 |
| EP | 1029740 A2 | 8/2000 |
| EP | 2578453 B1 | 1/2018 |
| EP | 3569449 A1 | 11/2019 |
| EP | 3569450 A1 | 11/2019 |
| FR | 1182068 A | 6/1959 |
| FR | 2899177 B1 | 12/2008 |
| FR | 2985475 A1 | 7/2013 |
| FR | 2989649 A1 | 10/2013 |
| GB | 2435245 A | 11/2010 |
| JP | 2021146741 A | 9/2021 |
| KR | 101541731 B1 | 8/2015 |
| KR | 102218022 B1 | 2/2021 |
| KR | 102253109 B1 | 5/2021 |
| WO | 2001047747 A1 | 7/2001 |
| WO | 2012168654 A1 | 12/2012 |
| WO | 2018162146 A1 | 9/2018 |
| WO | 2019015509 A1 | 1/2019 |
| WO | 2020144023 A1 | 7/2020 |
| WO | 2020171835 A1 | 8/2020 |
| WO | 2020176854 A1 | 9/2020 |
| WO | 2020244870 A1 | 12/2020 |
| WO | 2020254032 A1 | 12/2020 |

\* cited by examiner

US 11,897,424 B2

FRONT TRUNK STORAGE SYSTEM

CROSS-REFERENCE TO RELATED APPLICATIONS

This application claims the benefit of U.S. Provisional Patent Application Ser. No. 63/185,539, filed May 7, 2021, which is hereby incorporated by reference in its entirety for all purposes.

FIELD OF THE INVENTION

The present invention relates to a storage system for a vehicle, and in particular to a storage system configured for use in a front trunk of vehicle.

BACKGROUND

Automotive design is an ever-changing reality, with the continuous introduction of novel structural, functional, and aesthetic enhancements. Continuous improvements have also been central to the evolution of traditional propulsion systems, largely based around the internal combustion (IC) engine. The industry is now seeing a fundamental shift in respect of propulsion systems, with the goal of reducing and/or replacing the traditional IC engine with environmentally friendly options. One such example is the move towards propulsion systems based on the use of electric motors.

Vehicles of this type, generally referred to as electric vehicles (EV) implement a different arrangement of propulsion system components. While a conventional IC powered vehicle would have the IC engine located towards the front of the vehicle, the arrangement of propulsion system components in an EV generally results in the front region of the vehicle being largely unused, and therein presenting a space similar to that of a vehicle trunk. This 'front trunk' area of the vehicle, also referred to as a 'frunk', presents an opportunity for additional cargo storage handling capacity.

It is evident that the aforementioned 'front trunk' is well suited to the implementation of cargo storage solutions, to enhance the cargo carrying capacity and usability of this space. As such, there is clearly a need in the industry for novel developments in this regard.

SUMMARY OF THE INVENTION

According to an aspect of an embodiment, provided is a front trunk cargo storage system. The system includes a main body that defines a primary storage compartment, and a load floor drawer mounted upon a floor of the primary storage compartment. The primary storage compartment includes a forward opening, and the load floor drawer is configured to be slidable outwardly from the primary storage compartment through the forward opening.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DESCRIPTION OF THE EMBODIMENTS

The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, background, brief summary, or the following detailed description.

Figure 1:
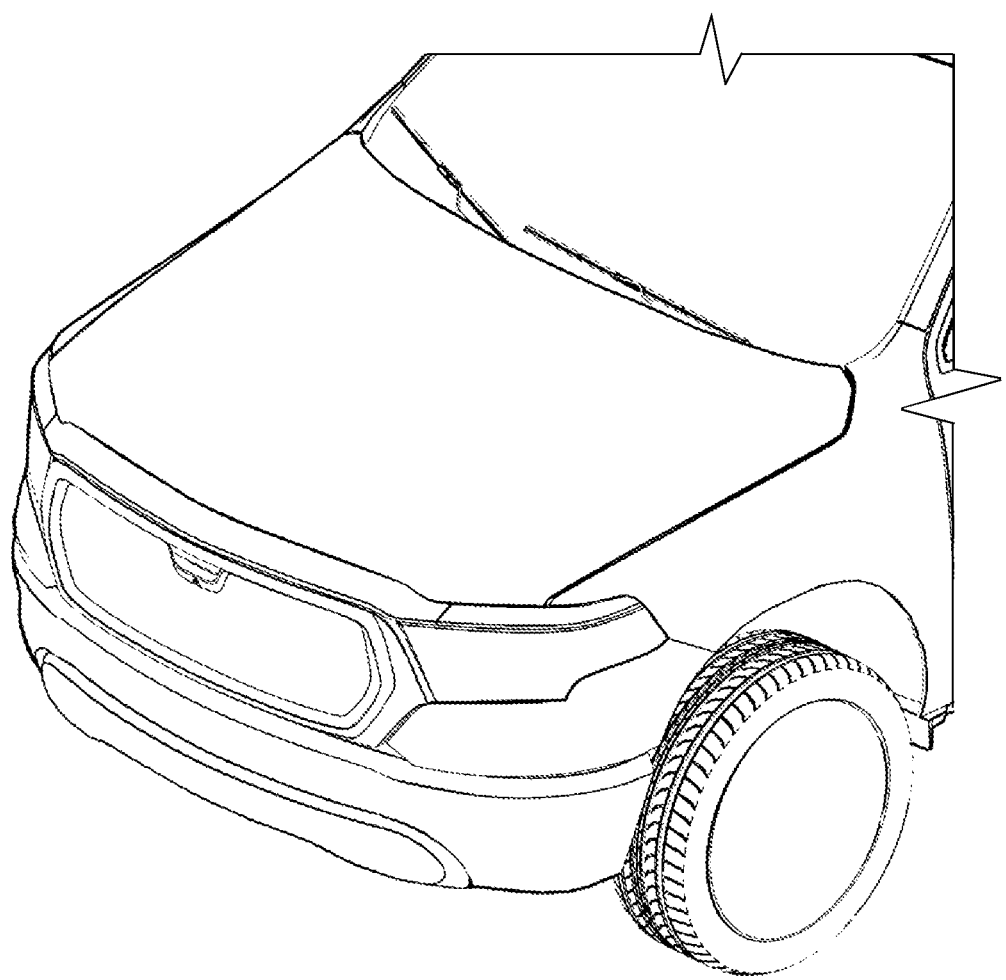
FIG. 1 is a partial perspective view of a front portion of a vehicle
Figure 2:
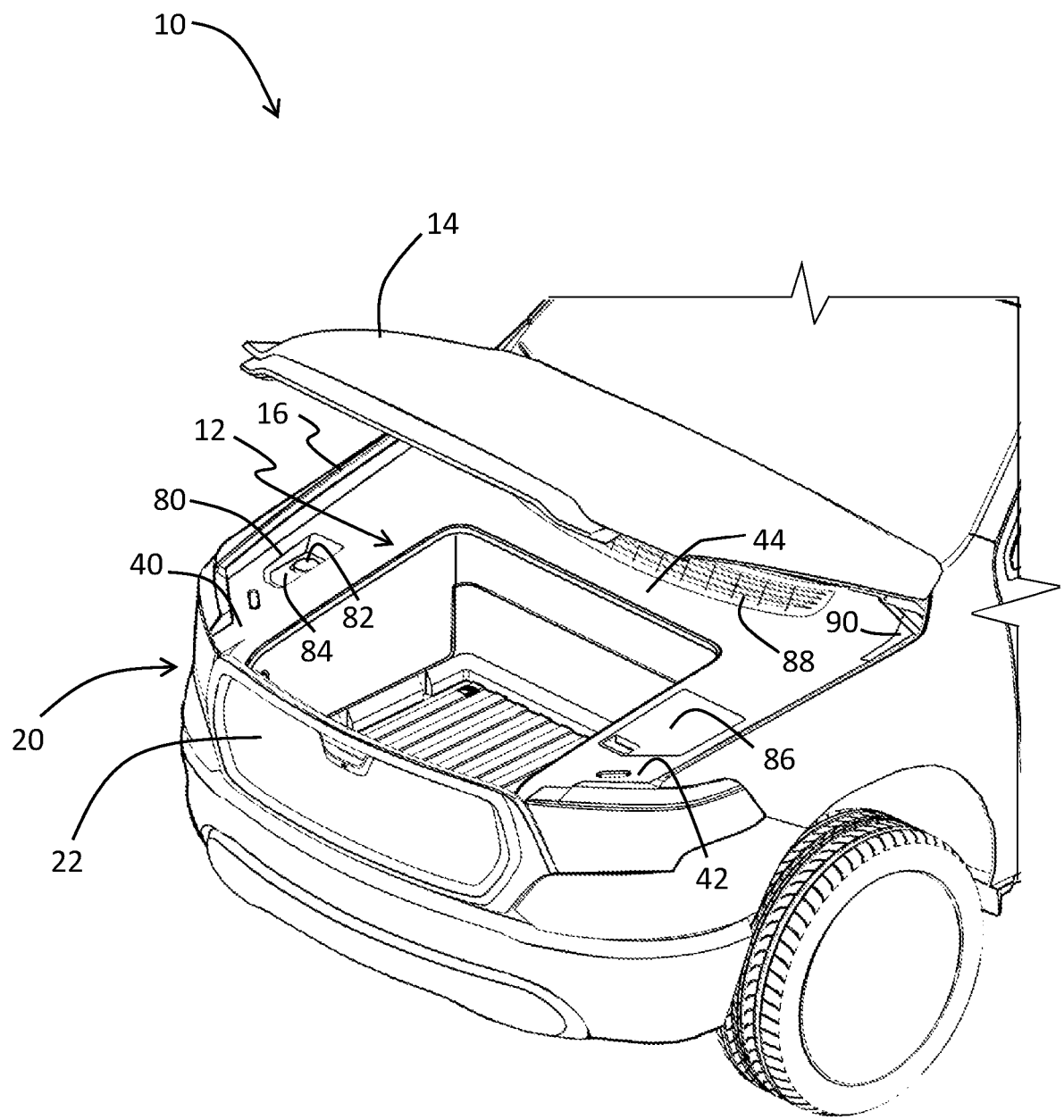
FIG. 2 is a partial perspective view of the vehicle with the hood in the open position, showing a cargo storage system according to a first embodiment of the invention.

With reference now to FIG. 1 and FIG. 2, shown is a front region of a vehicle 10, exemplified as a truck. Similar to conventional vehicles with an internal combustion (IC) engine, the front region includes a forward compartment 12 enclosed by a hood 14 and surrounding vehicle structure 16. While the forward compartment 12 in an IC vehicle is customarily used to house the engine, the forward compartment 12 (i.e. front trunk) of an electric or rear engine vehicle is generally intended for use as a cargo storage area.

Figure 3:
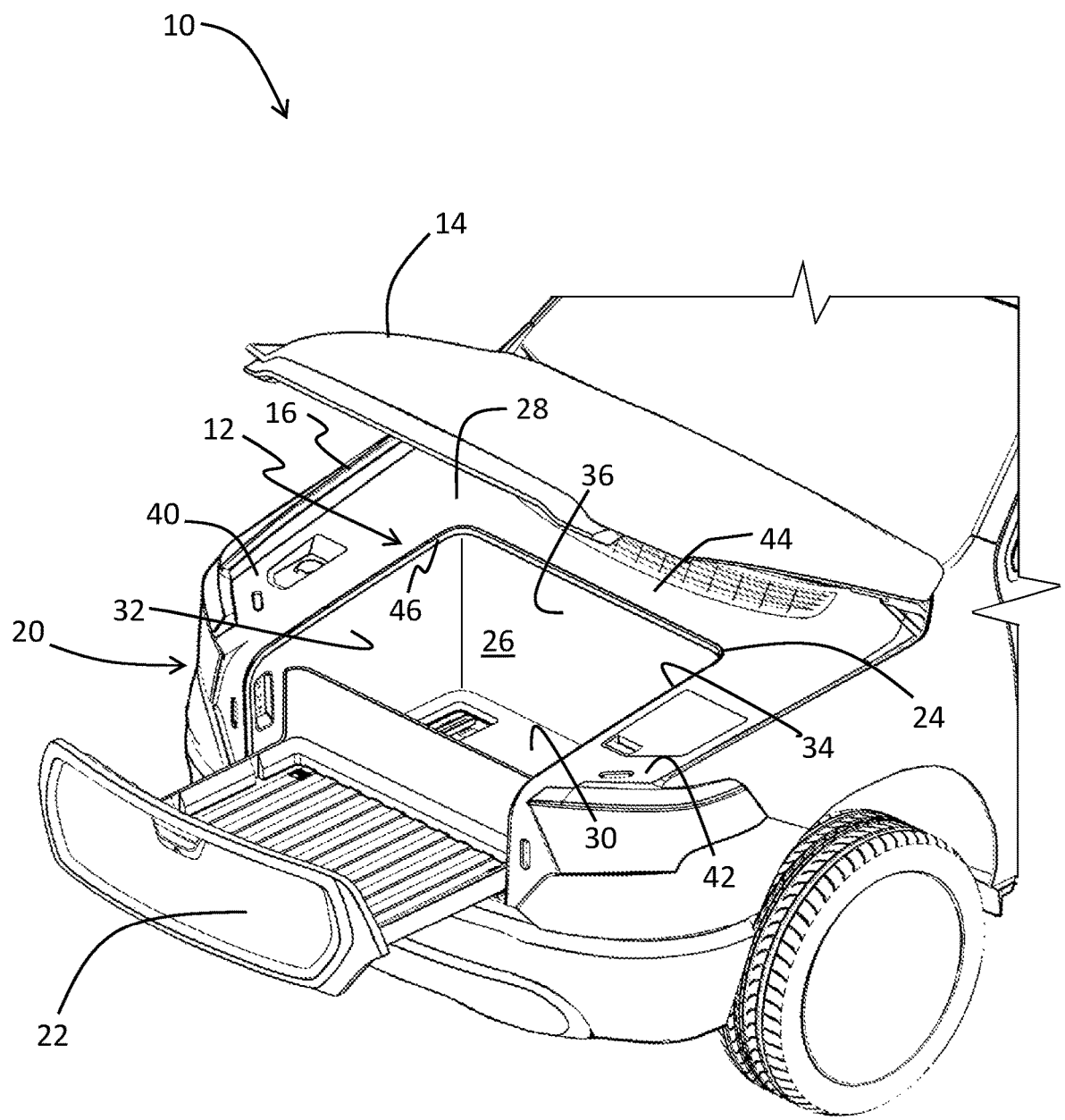
FIG. 3 is a partial perspective view of the vehicle having the cargo storage system of FIG. 1, with a retractable load floor drawer in the open position.

Continuing with FIG. 2, the forward compartment 12 of the vehicle is shown to house a cargo storage system 20, to facilitate the storage and handling of cargo items contained therein. With reference to FIG. 3, the storage system 20 further facilitates accessibility by providing a load floor drawer 22, the details of which will be described in greater detail below. As the following discussion details a system for placement in the front trunk of a vehicle, for the purposes of explanation, positional/directional terms such as forward, rearward, etc. are used to facilitate the identification of components and the spatial relationship between them. The use of positional/directional terms is not intended to be limiting in any way.

Figure 4:
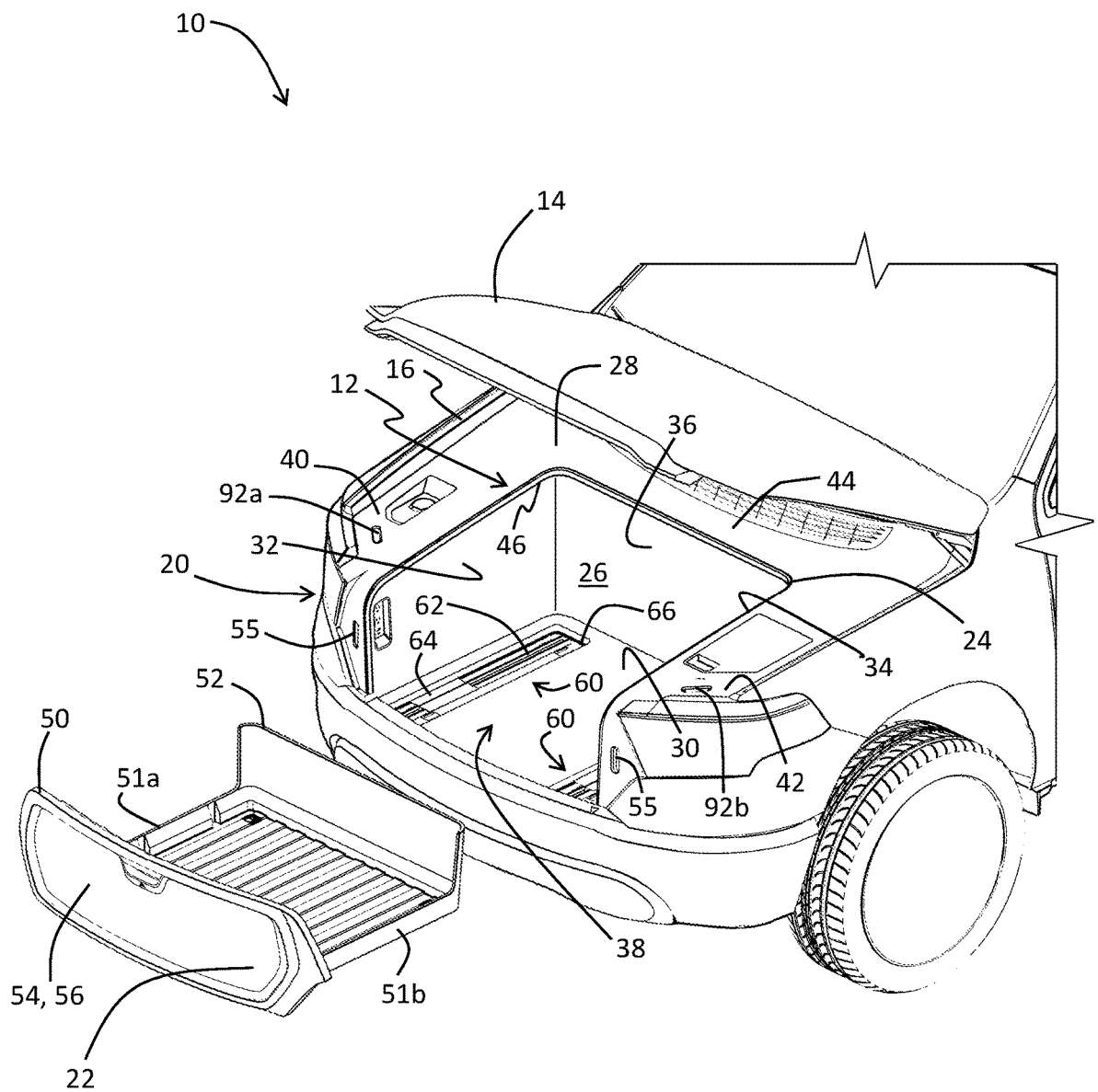
FIG. 4 is a partial perspective view of the vehicle having the cargo storage system of FIG. 1, showing the load floor drawer detached from the vehicle, for clarity in explanation of component parts.

The storage system 20 includes a main body 24 that defines a primary storage compartment 26 and a peripheral flange 28. The primary storage compartment 26 includes a floor 30, first side wall 32, an opposing second side wall 34, a rearward wall 36 and a forward opening 38 (see FIG. 4). The peripheral flange 28 includes a first flange portion 40, a second flange portion 42, and a rear flange portion 44, the flange portions 40, 42, 44 extending laterally from a top edge 46 of the primary storage compartment 26 to the surrounding vehicle structure. The peripheral flange 28 provides an aesthetically pleasing look to the storage system 20, by framing the primary storage compartment 26 relative to the forward compartment area. Additionally, the peripheral flange 28 serves to prevent items from falling into the broader forward compartment area, and therein potentially out of reach.

Figure 5A:
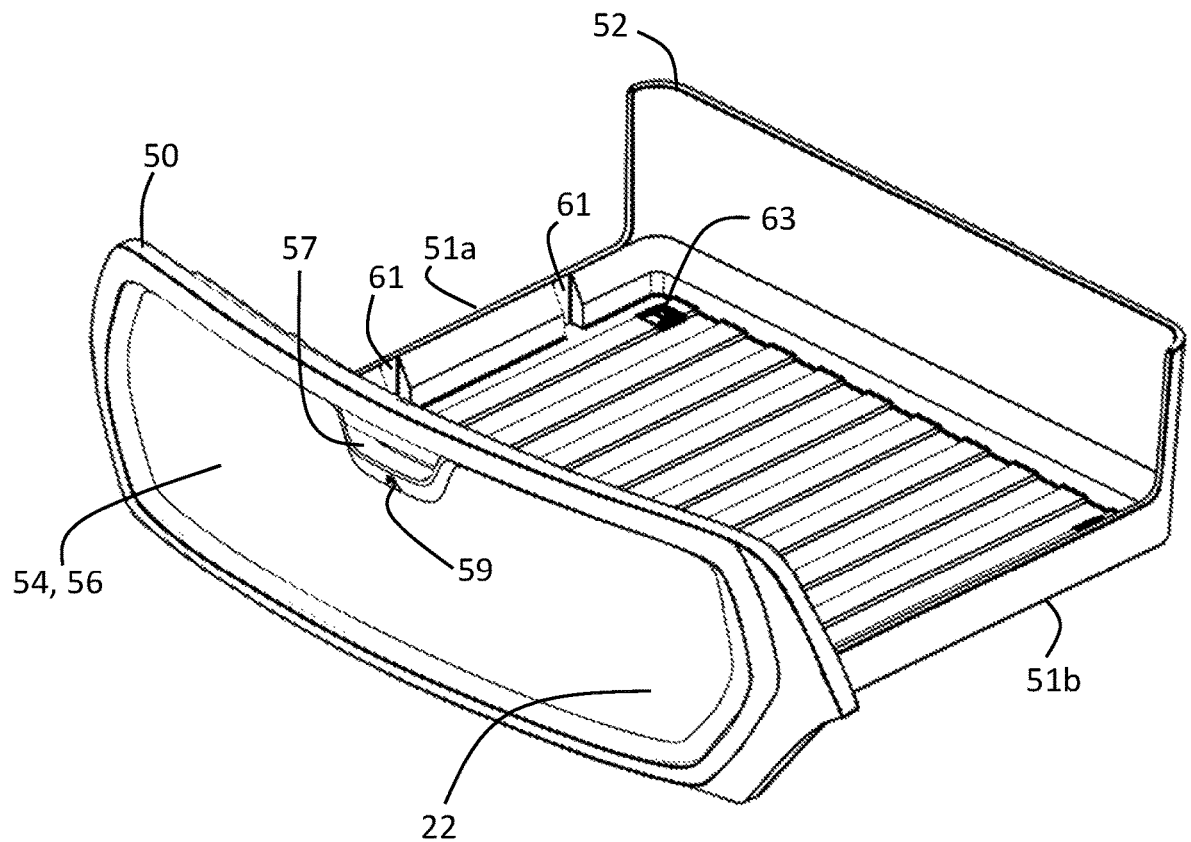
FIG. 5a is a perspective view of the forward end of the load floor drawer.

The floor 30 of the primary storage compartment 26 is configured and dimensioned to receive the moveable load floor drawer 22. The load floor drawer 22, shown separated in FIG. 4, and in isolation in FIG. 5a/b includes a forward drawer wall 50 and may optionally include additional enclosure walls, such as a first and second drawer side walls 51a, 51b and a rearward drawer wall 52. The optional additional enclosure walls may be only partial walls, that is configured with a height that extends only a portion of the full permissible height of the primary storage compartment 26.

The load floor drawer 22 is slidably mounted within the primary storage compartment 26 in a manner that permits for slidable motion outwardly from the forward opening 38. In this way, the load floor drawer 22 is slidable out from the front of the vehicle, with the forward drawer wall 50 forming at least a portion of the forward facing vehicle fascia 54. In the embodiment shown, the forward drawer wall 50 forms at least a portion of the front grille 56 of the vehicle, and may contain additional structural elements as deemed necessary to achieve the required structural rigidity/integrity.

Movement of the load floor drawer 22 is depicted in FIGS. 2 and 3, where FIG. 2 illustrates the load floor drawer 22 in a first position, and FIG. 3 illustrates the load floor drawer 22 in a second position. In the first position, the load floor drawer 22 is situated fully within the primary storage compartment 26, and is said to be in the fully retracted or closed position. In the second position, the load floor drawer 22 is situated at least partially outside the primary storage compartment 26, and is said to be in the fully extended or open position. It will be appreciated that the extent by which the load floor drawer 22 extends from the primary storage compartment 26 will in part be a function of the sliding mechanism used and its permissible range of motion. Nevertheless, in the fully extended or open position, the load floor drawer 22 is at least partially moveably displaced forwardly from the primary storage compartment 26, through the forward opening 38, therein permitting a user easier access to cargo items carried on the load floor drawer 22.

The displacement motion of the load floor drawer 22 outwardly from the primary storage compartment 26 through the forward opening 38 may be achieved in a number of ways. In the embodiment shown, a pair of floor-mounted slide mechanisms 60 are used. Each slide mechanism 60 includes a stationary rail 62 and a cooperating slidable carrier member 64. The stationary rail 62 is fixedly anchored to the floor 30 of the primary storage compartment 26 and/or a structural element of the vehicle (i.e. below the primary storage compartment 26), while the slidable carrier member 64 is fixedly attached to an underside surface of the load floor drawer 22. The stationary rail 62 may be recessed in a respective pocket 66 so as to reduce the spatial separation between an underside surface of the load floor drawer 22 and the floor 30 of the primary storage compartment 26. A variety of fasteners may be used to affix these components to their respective supports, including but not limited to threaded fasteners. While a pair of floor-mounted slide mechanisms 60 are used to exemplify the displaceable motion of the load floor drawer 22, a greater number, or few number of slide mechanisms 60 may be implemented. In addition, while the slide mechanisms are shown to be floor-mounted, in other embodiments the slide mechanisms may be mounted upon the opposing first and second side walls 32, 34 of the primary storage compartment 26. It is the intention of the applicant to include any such sliding mechanism that permits the load floor drawer 22 to move between the first and second positions. Furthermore, the displacement motion required of the load floor drawer 22 may be achieved using other mechanical devices, and it is the intention of the applicant to include any such mechanical device that permits the load floor drawer 22 to move between the first and second positions.

Figure 5B:
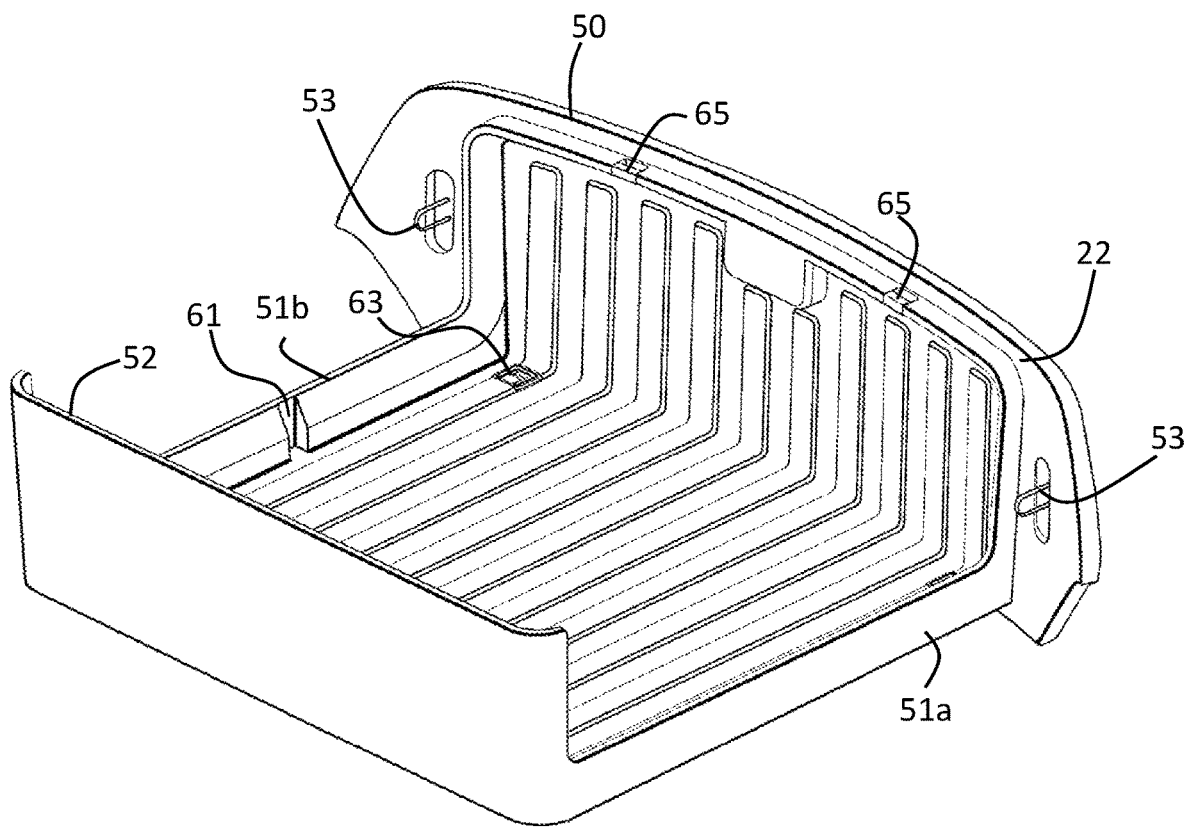
FIG. 5b is a perspective view of the rearward end of the load floor drawer.

The load floor drawer 22 is configured to include various components to facilitate its operability. Having regard to FIG. 5b, the rear-side of the forward drawer wall 50 is shown to include a pair of strikers 53 that act cooperatively with latches 55 provided on the vehicle structure. The latches 55 may be released either through a mechanical actuator, or using an electronic actuator that incorporates coded proximity detection (i.e. key-fob actuated). The forward drawer wall 50 may include a pull handle 57, and may be lockable using a locking mechanism 59. While the closure mechanism is exemplified as having the strikers 53 positioned on the forward drawer wall 50, it will be appreciated that the opposite arrangement of having the strikers on the vehicle structure and the latches on the load floor drawer is also contemplated. Continuing with FIG. 5a, the load floor drawer 22 may be provided with other features that extend or broaden its operability. For instance, the first and second drawer side walls 51a, 51b of the load floor drawer 22 may include recesses 61 that permit for the fitting of drawer dividers (not shown). The load floor drawer 22 may also include one or more tie-down points 63 and/or grocery hooks 65 to enable cargo items to be safely secured. In some embodiments, the load floor drawer 22, in particular the forward drawer wall 50 may be configured to support sensors and/or cameras (not shown).

Figure 6:
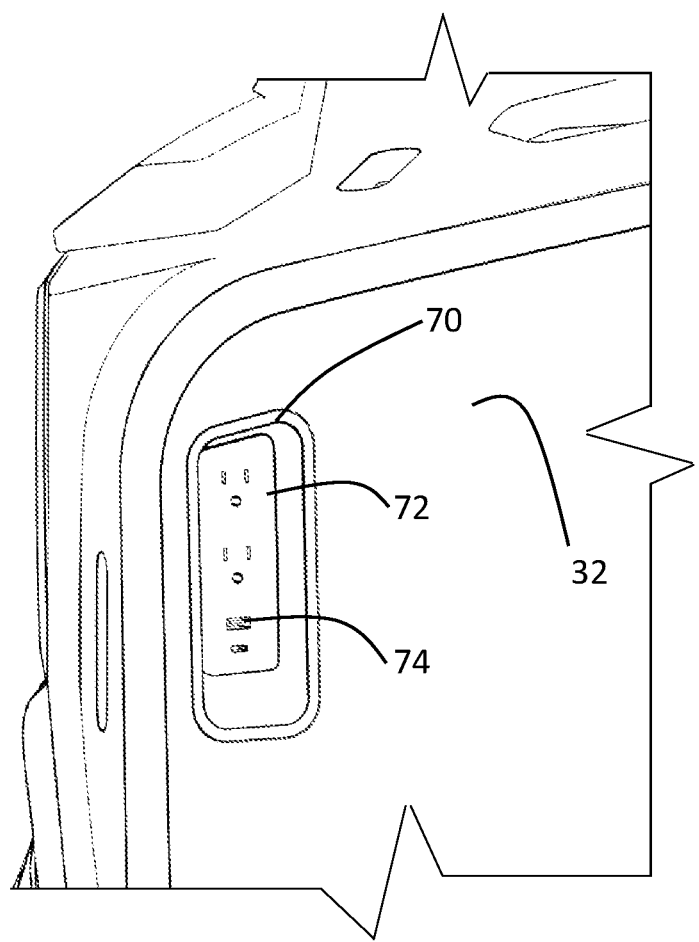
FIG. 6 is a partial perspective view of the first side wall, showing a first power panel.
Figure 7:
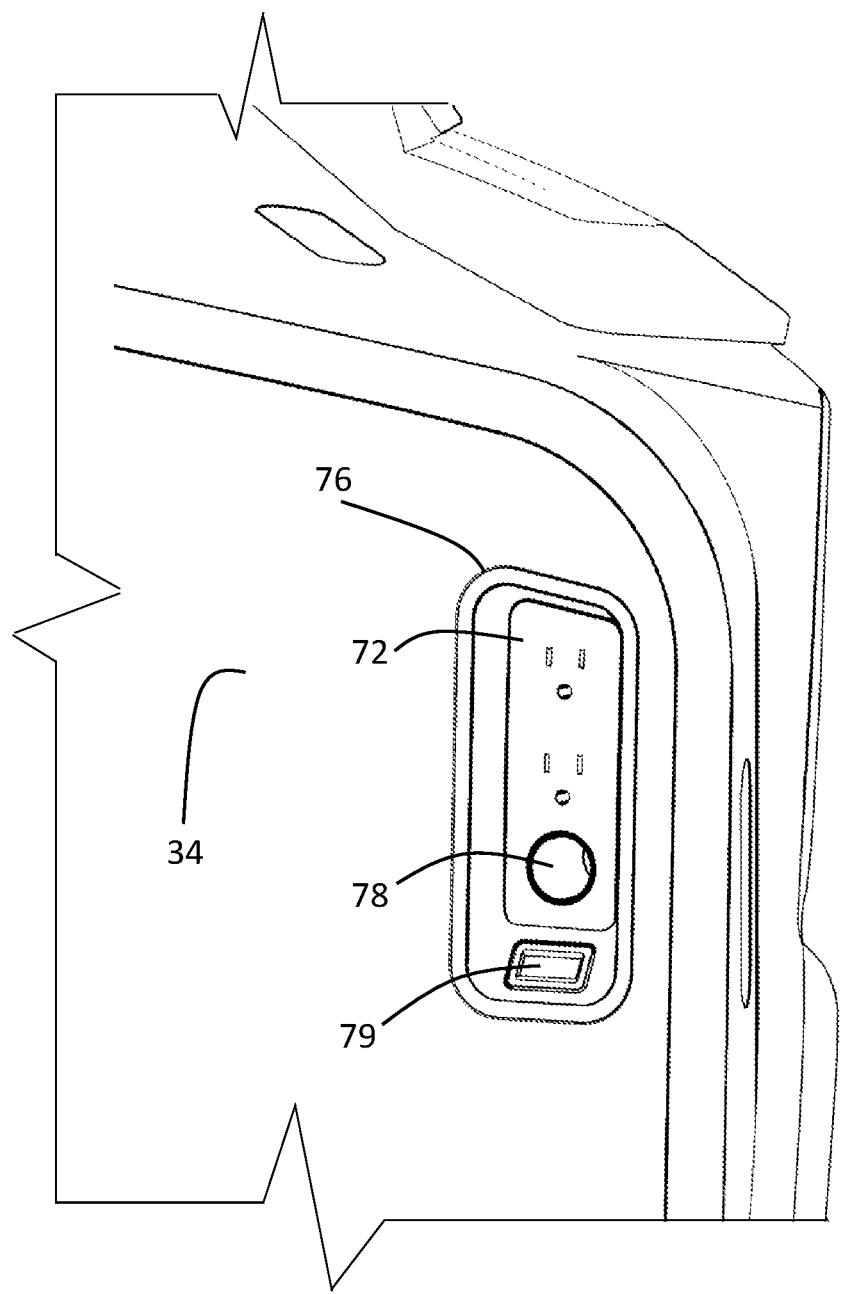
FIG. 7 is a partial perspective view of the second side wall, showing a second power panel.

The storage system 20 may be configured to include additional elements, for example various convenience features. In the embodiment shown, a variety of power elements are provided. With reference to FIG. 6, the first side wall 32 is shown to provide a first power panel 70, configured to include at least one 120 v power outlet 72, and at least one USB connector outlet 74. With reference to FIG. 7, the second side wall 34 is shown to provide a second power panel 76 configured to include at least one 120 v power outlet 72, at least one 12 v power socket 78, and an emergency hood and/or drawer release button 79. Having regard to FIG. 2, the first flange portion 40 is shown to include a fluid fill assembly 80, for example for a cleaning fluid (i.e. windshield washer fluid). The fluid fill assembly 80 may include a fill port 82 situated in a fluid fill receptacle 84. The opposing second flange portion 42 is shown to include an auxiliary storage compartment 86, for example to receive smaller items such as a charging cable, a flashlight, etc. The rear flange portion 44 is shown to include at least a portion of the HVAC air intake cowling 88, and is dimensioned with cutouts 90 to permit for required clearance with respect to hinges and hood struts (not shown). It will be appreciated that the inclusion and arrangement of convenience features is exemplary and may take on a variety of configurations. It will also be appreciated that the integration of adjacent components (i.e. the cowling) is dependent upon the design of the vehicle in question, and is merely exemplary of how the storage system 20 may be integrated into the surrounding architecture.

In the embodiment shown, the first and second flange portions 40, 42 also provide the required hardware to enable locked and secure closure of the hood, in cooperation with hardware provided on the hood. More specifically, the first flange portion 40 supports a first latch 92a while the second flange portion 42 supports a second latch 92b. It will be appreciated that additional strength to the hood closure mechanism may be achieved by anchoring the first and second latches 92a, 92b to respective surfaces on the vehicle structure, generally below the first and second flange portions 40, 42. Corresponding strikers 93 would be provided on the underside surface of the hood 14 (see FIG. 8).

Figure 8:
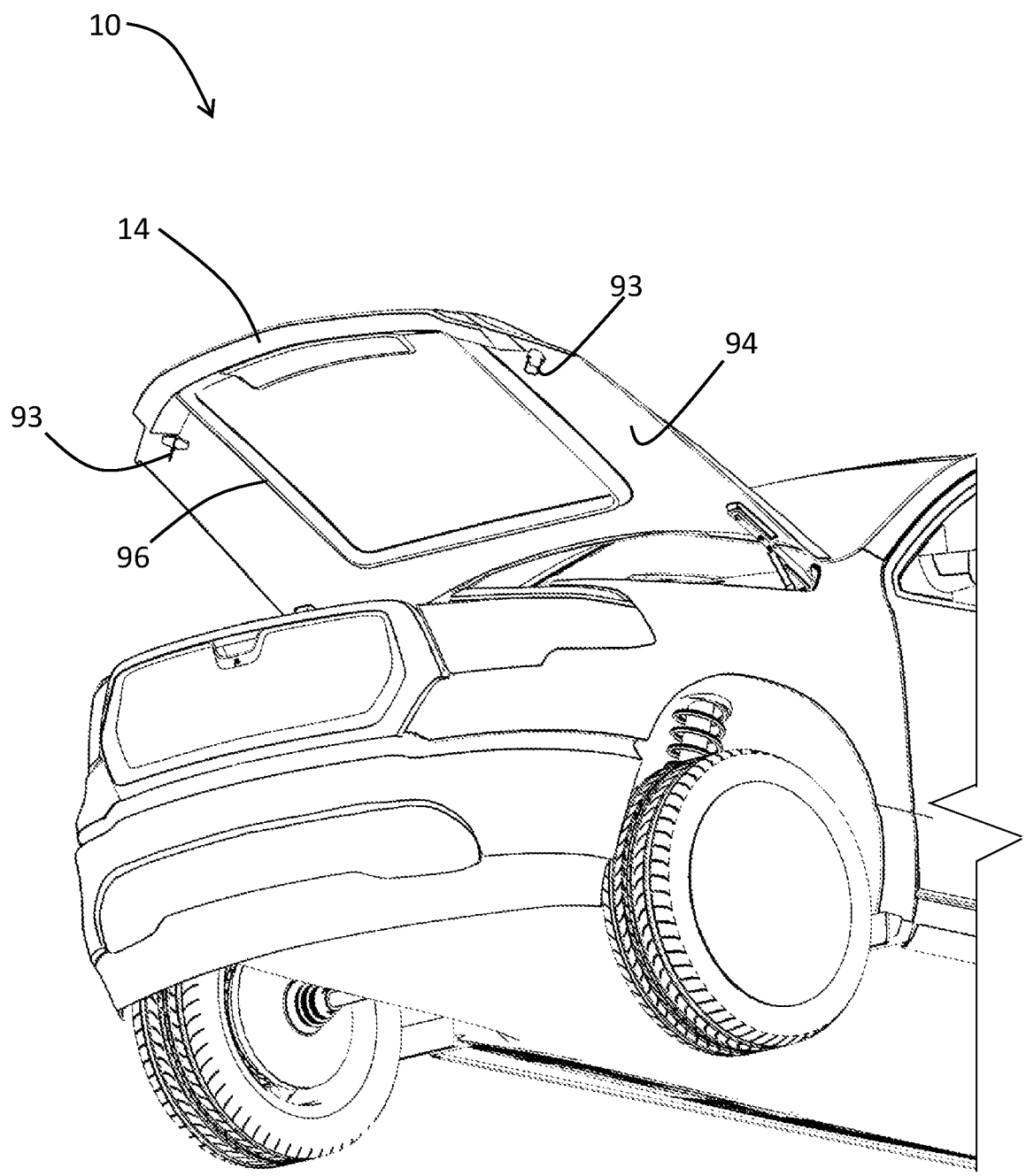
FIG. 8 is a partial perspective view of the vehicle, showing an underside area of the hood.

With reference to FIG. 8, shown is an underside surface of the hood 14. The underside surface 94 is shown to provide a compartment closure member 96 that upon closure of the hood 14, the compartment closure member 96 seats upon the primary storage component 26, in particular upon a cooperating surface around the periphery of the top edge 46. A seal may be provided on either, or both the compartment closure member 96 and the periphery of the top edge 46, to enhance the sealing effect therebetween.

Figure 9:
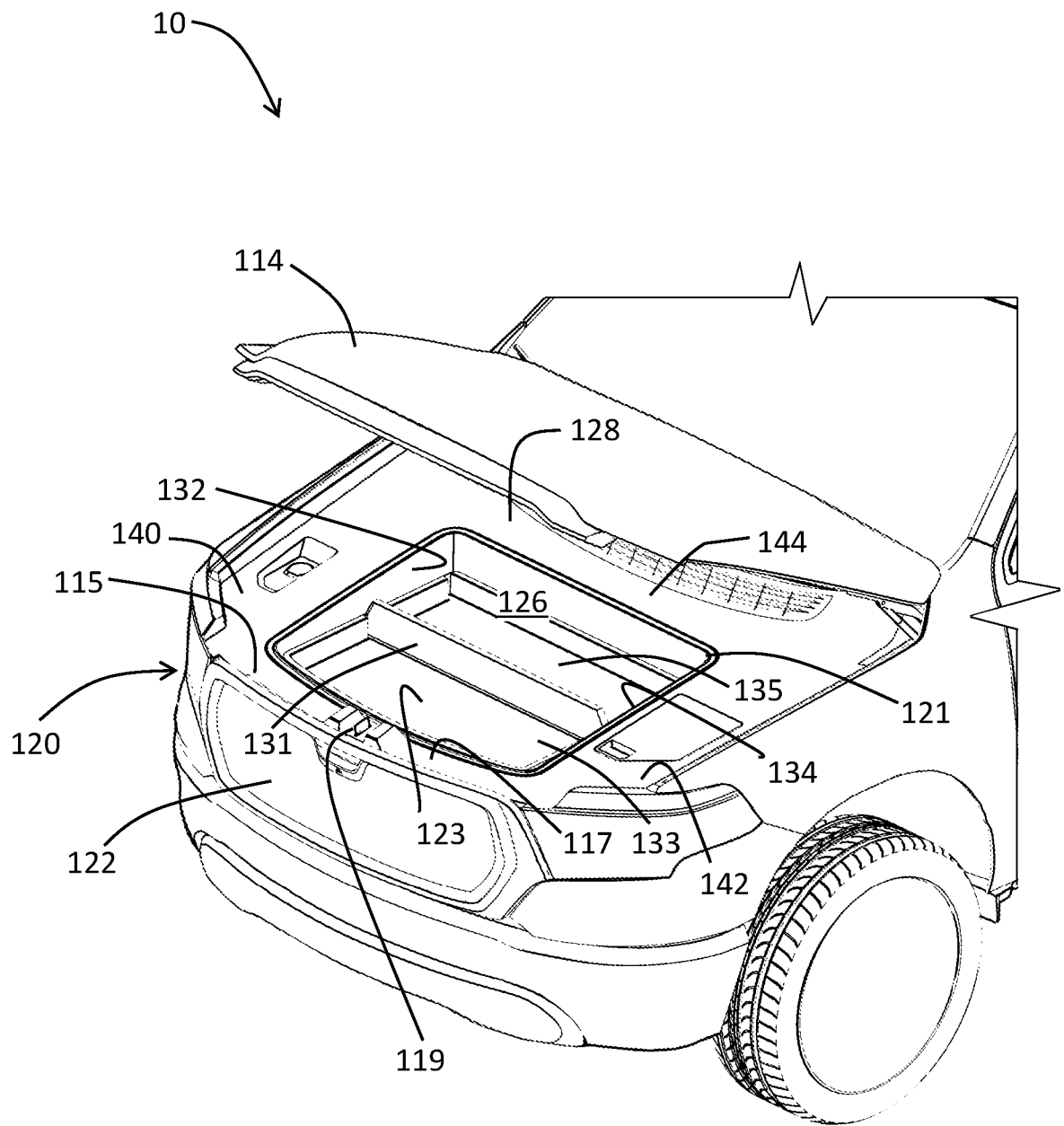
FIG. 9 is a partial perspective view of the vehicle, showing a cargo storage system according to a second embodiment of the invention.

With reference now to FIG. 9, shown is an alternative embodiment of a storage system 120. The storage system 120 is configured in much the same way as the storage system 20, with the addition of a crossbar 115 across the top region of the forward opening 138, spanning between the first side wall 132 and the second side wall 134. The crossbar 115 provides additional structural integrity to the construction of the vehicle, and may be a necessary feature for certain vehicle designs (i.e. trucks, SUVs, etc.). As all other aspects of the alternative embodiment of FIG. 9 are as previously described having regard to the embodiment of FIGS. 2 to 8, only differences will be noted, and where necessary, reference to similar elements will be accompanied by like numerals, increased by 100.

The crossbar 115 may be formed as part of the peripheral flange 128, and in particular is formed by, or at least covered by a forward flange portion 117. The crossbar 115 may support a number of features, and in the embodiment shown, supports a central striker 119 that cooperates with a latch (not shown) provided on an underside surface of the hood 114.

The arrangement of the peripheral flange 128, and in particular the first flange portion 140, the opposing second flange portion 142, the rearward flange portion 144 and the forward flange portion 117 defines a top-side opening 121 for the primary storage compartment 126. For added cargo storage functionality, the top-side opening 121 may be configured to hold a cargo tray 123. As such, the arrangement of the cargo tray 123 serves to divide the primary storage compartment 126 into a lower storage compartment 125 and an upper storage compartment 127. The cargo tray 123 may include features that enable it to be subdivided into smaller storage areas. In the embodiment shown, a divider 131 is used to divide the cargo tray 123 into a forward tray receptacle 133 and a rear tray receptacle 135.

Figure 10:
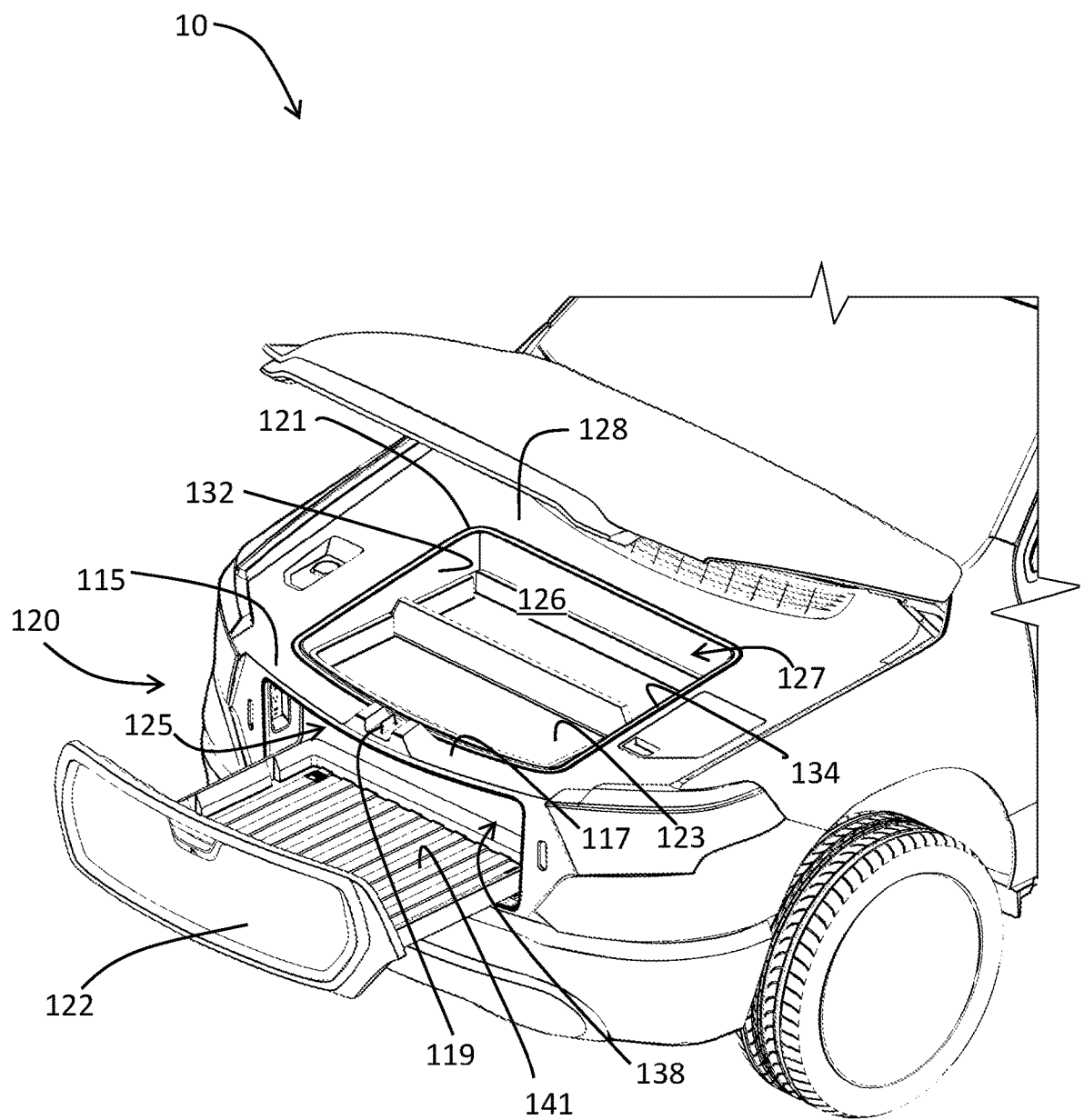
FIG. 10 is a partial perspective view of the vehicle having the cargo storage system of FIG. 10, with a retractable load floor drawer in the open position.

The storage system 120 is operable in much the same way as the storage system 20 of the previous embodiment. With reference to FIG. 9, the system 120 is shown with the load floor drawer 122 in the closed position, while the configuration shown in FIG. 10 has the load floor drawer 122 in the open position.

Figure 11:
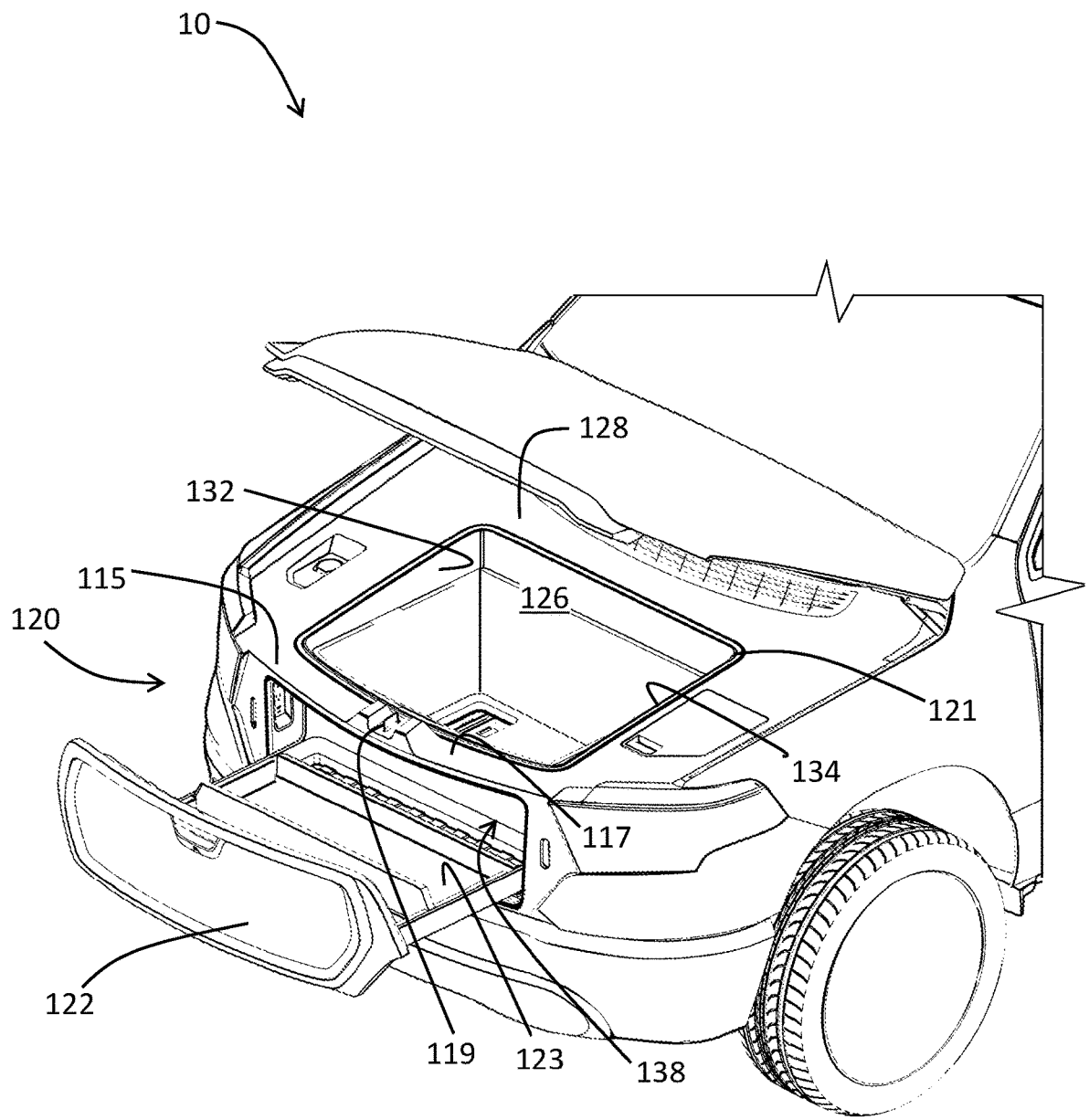
FIG. 11 is a partial perspective view of the vehicle having the cargo storage system of FIG. 10, showing a cargo tray located in the lower storage compartment, on the load floor drawer.

In some embodiments, it is preferable to configure the cargo tray 123 as removeable from the top-side opening 121 of the peripheral flange 128. To facilitate storage of the cargo tray 123, the base 141 of the load floor drawer 122 may be formed with features that cooperate an underside surface of the cargo tray 123, such that the cargo tray 123 is retained in position within the lower storage compartment 125, as shown for example in FIG. 11. In some embodiments, this arrangement of having the cargo tray 123 positioned on the base 141 of the load floor drawer 122 may be lockable, to prevent inadvertent dislodgement during use.

Figure 12:
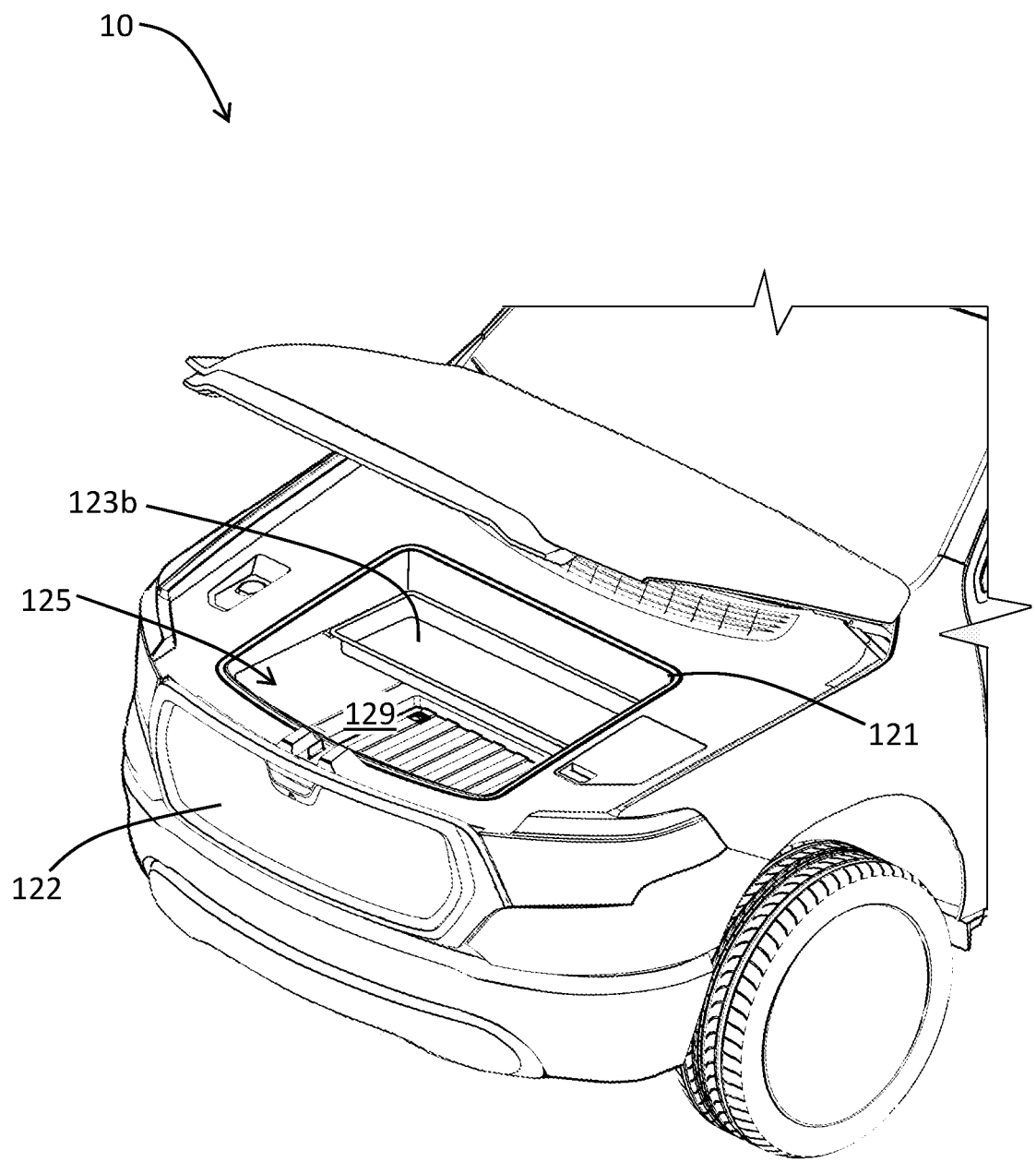
FIG. 12 is a partial perspective view of the vehicle having the cargo storage system of FIG. 10, showing a first alternative embodiment of the cargo tray.

In some embodiments, the cargo tray may only partially occupy the top-side opening 121. With reference to FIG. 12, shown is a cargo tray 123b that is configured to occupy the rearward portion of the top-side opening 121. Accordingly, an access opening 129 is included in the forward portion of the top-side opening 121, enabling access to the lower storage compartment 125 without opening the load floor drawer 122. In some embodiments, the cargo tray 123b may be positionable in either the forward or rearward portion of the top-side opening 121, depending on the particular need and/or arrangement of cargo to be transported.

Figure 13:
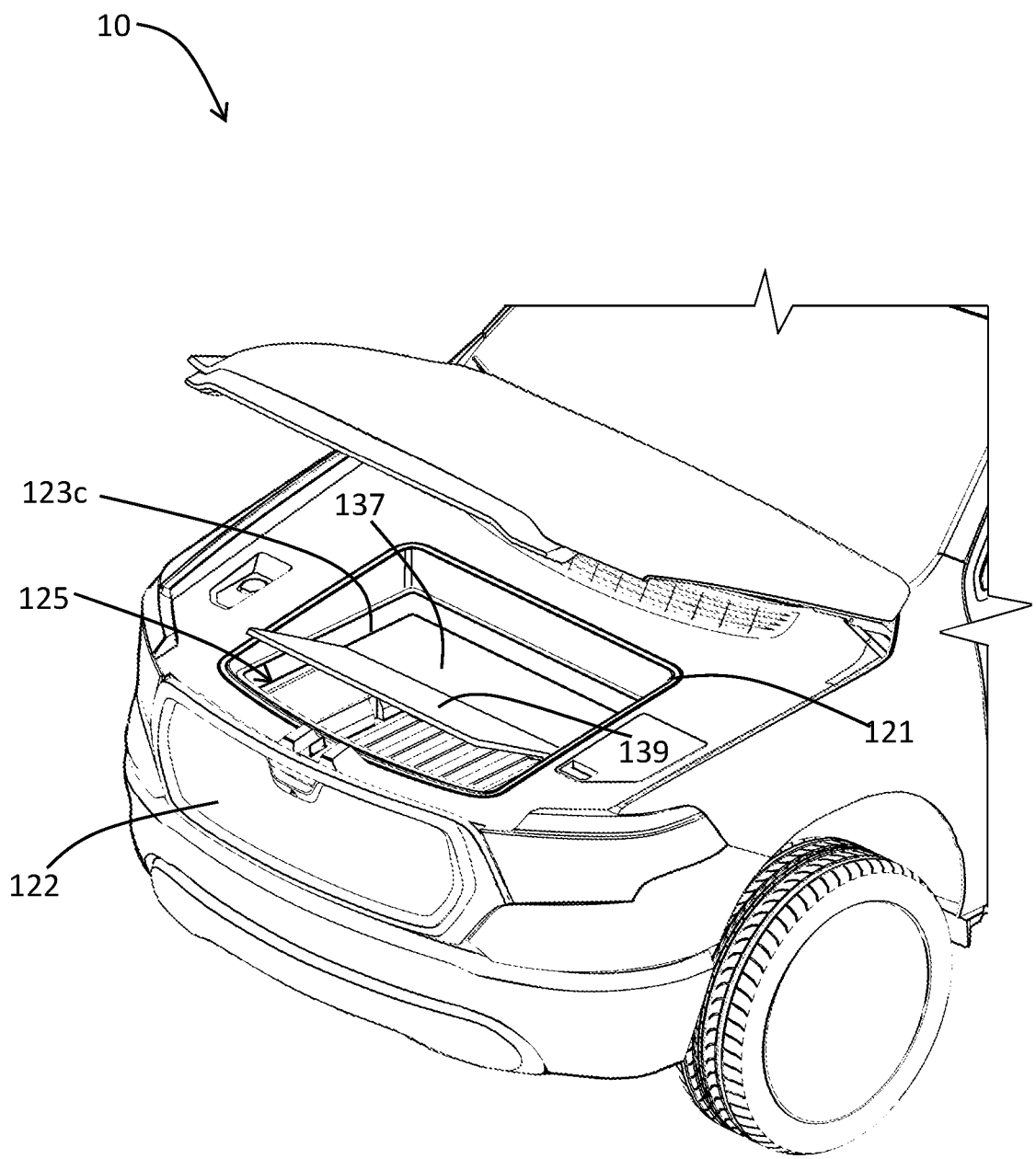
FIG. 13 is a partial perspective view of the vehicle having the cargo storage system of FIG. 10, showing a second alternative embodiment of the cargo tray.

In some embodiments, the cargo tray may include one or more removeable or hinged panels. With reference to FIG. 13, shown is a cargo tray 123c that is configured to have a removeable or hinged panel 139 in a forward portion of the base-portion 137, to enable access to the lower storage compartment 125 without having to remove the cargo tray 123, or open the load floor drawer 122. The cargo tray 123c may be configured with the removeable or hinged panel 139 located in either the forward or rearward portions.

Materials

A variety of manufacturing methodologies may be used to manufacture the cargo storage systems 20, 120 detailed above. It will be appreciated that suitable materials will include those compatible with the chosen manufacturing methodology. A non-limiting example of suitable materials includes polypropylene, polyethylene, acrylonitrile butadiene styrene (ABS), polycarbonate-acrylonitrile butadiene styrene (ABS/PC), polyamide, polylactic acid (PLA) and polyphenylene sulfide (PPS). To meet desired strength and rigidity requirements, the thermoplastic may additionally include a range of inorganic filler components, a non-limiting example of which includes glass, mica, calcium carbonate and talc, and/or organic filler components, a non-limited example of which includes jute, husk, and hemp.

It should be noted that in the description, terms such as forward, front and derivations of these terms are intended to mean or refer to an orientation directed towards, or a location situated towards, the front of the vehicle or component in question relative to its orientation within a vehicle. Similarly, terms such as rearward, rear and derivations of these terms are intended to mean or refer to an orientation directed towards, or a location situated towards, the back of the vehicle or component in question relative to its orientation within a vehicle. Terms such as up, upper, upward, and derivations of these terms are intended to mean or refer to an orientation that is above or on a top side of the vehicle or component in question relative to its orientation within a vehicle. Terms such as lower, down, downward, and derivations of these terms are intended to mean or refer to an orientation that is below or on a bottom side of the vehicle or component in question relative to its orientation within a vehicle. The term outer, outboard, outside and derivations of these terms is intended to mean or refer to an orientation directed towards, or a location situated outwardly from the side of the vehicle or component in question relative to its orientation within a vehicle. The term inner, inboard, inside and derivations of these terms is intended to mean or refer to an orientation directed towards, or a location situated towards a longitudinal centerline of the vehicle, or component in question relative to its orientation within a vehicle.

In addition, the terms "preferred," "preferably," or "in particular," "for example" or similar terms are used in association with optional features without thereby restricting alternative embodiments. Thus, features which are introduced by these terms are optional features, and there is no intention to restrict the scope of protection of the claims and, in particular, the independent claims by means of these features. Thus, as a person skilled in the art will recognize, the invention can also be implemented using different embodiments. In a similar way, features which are introduced by "in one embodiment of the invention" or by "in one illustrative embodiment of the invention" are understood to be optional features without any intention thereby to restrict alternative embodiments or the scope of protection of the independent claims. Moreover, these introductory expressions are not intended to affect all the ways of combining the features introduced thereby with other features, whether optional or non-optional features.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

The invention claimed is:

1. A front trunk cargo storage system, the system comprising:
    a main body that defines a primary storage compartment; and
    a load floor drawer mounted upon a floor of the primary storage compartment, wherein the load floor drawer includes a forward drawer wall and additional enclosure walls including a first side wall, a second side wall, and a rearward drawer wall, and wherein one or more of the additional enclosure walls extend at least a portion of the full permissible height of the primary storage compartment,
    wherein the primary storage compartment includes a forward opening, and
    wherein the load floor drawer is configured to be slidable outwardly from the primary storage compartment through the forward opening.

2. The cargo storage system according to claim 1, wherein the primary storage compartment further comprises a first side wall, an opposing second side wall and a rearward wall opposite the forward opening.

3. The cargo storage system according to claim 2, wherein the main body further comprises a peripheral flange having a first flange portion, a second flange portion, and a rear flange portion, the flange portions extending laterally from a top edge of the primary storage compartment to the surrounding vehicle structure.

4. The cargo storage system according to claim 1, wherein the load floor drawer is mounted upon the floor of the primary storage compartment using at least one floor mounted slide mechanism.

5. The cargo storage system according to claim 4, wherein the floor mounted slide mechanism includes a stationary rail and a slidable carrier member, the stationary rail being fixedly anchored to the floor of the primary storage compartment, while the slidable carrier member is fixedly attached to an underside surface of the load floor drawer.

6. The cargo storage system according to claim 5, wherein the stationary rail is recessed in a respective pocket on the floor of the primary storage compartment.

7. A front trunk cargo storage system, the system comprising:
    a main body that defines a primary storage compartment, wherein the primary storage compartment includes a forward opening; and
    a load floor drawer mounted upon a floor of the primary storage compartment, wherein the load floor drawer includes a forward drawer wall and the forward drawer wall forms at least a portion of a forward facing vehicle fascia, including but not limited to a front grille of the vehicle, and
    wherein the load floor drawer is configured to be slidable outwardly from the primary storage compartment through the forward opening.

8. The cargo storage system according to claim 7, wherein the load floor drawer is mounted upon the floor of the primary storage compartment using at least one floor mounted slide mechanism.

9. The cargo storage system according to claim 8, wherein the floor mounted slide mechanism includes a stationary rail and a slidable carrier member, the stationary rail being fixedly anchored to the floor of the primary storage compartment, while the slidable carrier member is fixedly attached to an underside surface of the load floor drawer.

10. The cargo storage system according to claim 9, wherein the stationary rail is recessed in a respective pocket on the floor of the primary storage compartment.

11. The cargo storage system according to claim 7, wherein the primary storage compartment further comprises a first side wall, an opposing second side wall and a rearward wall opposite the forward opening, and wherein the main body further comprises a peripheral flange having a first flange portion, a second flange portion, and a rear flange portion, the flange portions extending laterally from a top edge of the primary storage compartment to the surrounding vehicle structure.

12. A front trunk cargo storage system, the system comprising:
    a main body that defines a primary storage compartment, wherein the primary storage compartment includes a forward opening;
    a compartment closure member provided upon an underside surface of a hood of the vehicle, the compartment closure member being configured to seat upon a cooperating surface around a periphery of a top edge of the primary storage compartment; and a load floor drawer mounted upon a floor of the primary storage compartment, wherein the load floor drawer is configured to be slidable outwardly from the primary storage compartment through the forward opening.

13. The cargo storage system according to claim 12, wherein a seal is provided at the interface between the compartment closure member and the periphery of the top edge of the primary storage compartment, to enhance a sealing effect therebeween.

14. A front trunk cargo storage system, the system comprising:

a main body that defines a primary storage compartment, wherein the primary storage compartment includes a forward opening, a first side wall, an opposing second side wall and a rearward wall opposite the forward opening;

a crossbar extending across a top region of the forward opening, spanning between the first side wall and the opposing second side wall of the primary storage compartment; and a load floor drawer mounted upon a floor of the primary storage compartment, wherein the load floor drawer is configured to be slidable outwardly from the primary storage compartment through the forward opening.

15. The cargo storage system according to claim 14, wherein the main body further comprises a peripheral flange having a first flange portion, a second flange portion, a rear flange portion and a forward flange portion, the flange portions extending laterally from a top edge of the primary storage compartment to the surrounding vehicle structure and wherein the crossbar is formed as part of the forward flange portion of the peripheral flange.

16. The cargo storage system according to claim 15, wherein the peripheral flange defines a top-side opening of the primary storage compartment, and wherein the top-side opening is configured to support a cargo tray that divides the primary storage compartment into a lower storage compartment, and an upper storage compartment.

17. The cargo storage system according to claim 16, wherein the cargo tray is removeable from the top-side opening, and wherein the cargo tray is configured to be positioned and retained upon the load floor drawer in the lower storage compartment.

18. The cargo storage system according to claim 16, wherein the cargo tray is provided with one or more removeable or hinged panels.

* * * * *